United States Patent [19]

Uhde

[11] Patent Number: 4,774,606

[45] Date of Patent: Sep. 27, 1988

[54] HEAD WHEEL ARRANGEMENT FOR A RECORDER WITH THREADED SPINDLE FOR ADJUSTABILITY

[75] Inventor: Dietmar Uhde, Königsfeld, Fed. Rep. of Germany

[73] Assignee: Deutsche Thomson-Brandt GmbH, Villingen-Schwenningen, Fed. Rep. of Germany

[21] Appl. No.: 935,505

[22] Filed: Nov. 26, 1986

[30] Foreign Application Priority Data

Nov. 28, 1985 [DE] Fed. Rep. of Germany ....... 3542064

[51] Int. Cl.⁴ ............................................ G11B 5/588
[52] U.S. Cl. ...................................... 360/75; 360/84; 360/107; 360/77
[58] Field of Search ...................... 360/69, 75, 77, 84, 360/107, 109; 369/27; 358/347

[56] References Cited

U.S. PATENT DOCUMENTS

| | | | |
|---|---|---|---|
| 3,576,405 | 4/1971 | Dollenmayer | 369/27 |
| 4,030,133 | 6/1977 | Yamada et al. | 360/107 |
| 4,040,109 | 8/1977 | Kryltsov | 360/107 |
| 4,369,473 | 1/1983 | Eibensteiner | 360/84 |
| 4,495,609 | 1/1985 | Russell | 358/347 |

FOREIGN PATENT DOCUMENTS

| | | |
|---|---|---|
| 349223 | 3/1979 | Austria . |
| 0023067 | 7/1980 | European Pat. Off. . |
| 2535780 | 2/1978 | Fed. Rep. of Germany . |
| 3307324 | 9/1984 | Fed. Rep. of Germany . |
| 3517317 | 5/1985 | Fed. Rep. of Germany . |
| 3529008 | 8/1985 | Fed. Rep. of Germany . |
| 3509584 | 9/1986 | Fed. Rep. of Germany . |
| 55-163626 | 12/1980 | Japan .................................. 360/75 |

Primary Examiner—Raymond F. Cardillo
Assistant Examiner—David L. Robertson
Attorney, Agent, or Firm—Spencer & Frank

[57] ABSTRACT

A rotating head wheel for a recorder wherein the head wheel is additionally displaceable in the direction of its axis of rotation. The displacement is produced by mounting the head wheel on a threaded spindle which rotates in the same direction as the head wheel and whose rate of rotation is variable.

19 Claims, 4 Drawing Sheets

HEAD WHEEL ARRANGEMENT FOR A RECORDER WITH THREADED SPINDLE FOR ADJUSTABILITY

BACKGROUND OF THE INVENTION

Recorders, for example video recorders, are known in which a rotating head wheel is enclosed wholly or partially by a magnetic tape. The head wheel is equipped with one or a plurality of heads which record tracks on the magnetic tape in a helical, transversal or parallel orientation relative to the edge of the tape.

In certain recorders, the prescribed process of recording successive tracks or other special modes of operation require the head wheel to be displaced in the direction of the axis of rotation. Such an axial displacement is required, for example, in matrix recording on tracks that extend parallel to the edge of the tape as disclosed in German Patent Application No. P 35 09 584. The axial displacement may also serve to shift the head wheel into another region of the magnetic tape. This is appropriate, for example, if, according to German Offenlegungsschrift [laid-open patent application] No. 3,307,324, two or more groups of tracks containing different signals are recorded on the magnetic tape. The axial displacement is also required in a recorder operating with helical track recording in which, according to German Patent Application No. P 35 17 317, special modes of tape movement require the shifting of the head wheel in the direction of its axis. It has previously been proposed to bring about such axial displacement of the head wheel by means of a cam which acts axially on the head wheel, by means of a dipper coil, an actuator, or by means of a stepping motor.

The prior art solutions for such lifting movement have various drawbacks. These drawbacks include, among other things, a lack of mechanical accuracy in that, a play develops upon the reversal of the axial displacement due to the relatively large mass to be reversed and the dependence on gravity.

SUMMARY OF THE INVENTION

It is an object of the present invention to provide a solution for the above-mentioned axial displacement of the head wheel so that such displacement is performed with greater accuracy, lower frictional losses and wherein smaller masses are to be reversed.

The above and other objects are accomplished by the invention wherein a head wheel arrangement for a magnetic recorder is provided which includes:

a head wheel about which a magnetic tape is guided, the head wheel having an axis about which the head wheel is rotatable in a given direction;

a threaded spindle which is rotatable about the axis in the given direction, the head wheel being mounted on the threaded spindle for displacement relative to the threaded spindle in the direction of the axis when the head wheel and the threaded spindle are rotated in the given direction with different rates of rotation; and means for varying the rate of rotation of the threaded spindle in response to a control voltage so as to produce such displacement.

The solution according to the present invention has several advantages. Due to the fact that the head wheel and the threaded spindle initiating the displacement in the direction of the axis of rotation are in form locking engagement with one another, gravity has no influence. That means that the head wheel arrangement operates independently of its respective position. Bearing friction and contact friction are kept low because the head wheel and the threaded spindle always rotate in the same direction and at a high speed, even if there is no axial displacement of the head wheel. The axial displacement is effected merely by a change in the speed of the threaded spindle. The head wheel then moves in one or the other direction corresponding to the difference between the speed of the head wheel and the speed of the threaded spindle. Since the head wheel and threaded spindle constantly rotate in the same direction, no reversal of rotating masses is required.

The invention will now be described for one embodiment thereof and with reference to the drawing.

BRIEF DESCRIPTION OF THE DRAWINGS

FIGS. 4a and 4b are side and plan sectional views, respectively, of a modified embodiment of components of FIG. 1a.

DESCRIPTION OF THE PREFERRED EMBODIMENT

Figure 1A:
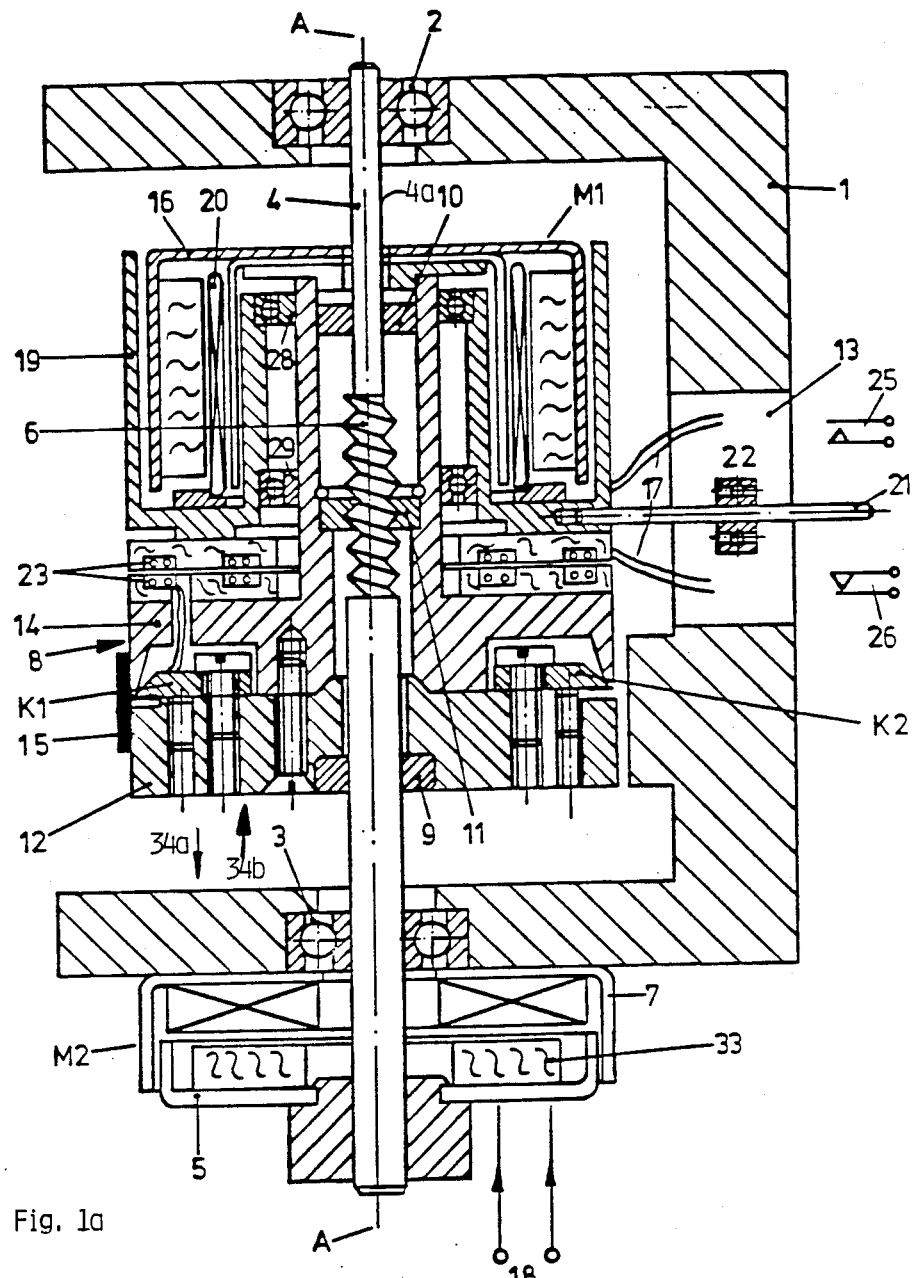
FIG. 1a is a sectional view showing a structural embodiment of a head wheel arrangement according to the present invention.

In FIG. 1a, a shaft 4 supporting a threaded spindle 6 is mounted by means of bearings 2 and 3 to be rotatable but not axially displaceable. The lower end of shaft 4 is connected with a rotor 5 of a motor M2 whose stator 7 is fixed to frame 1. A head wheel 8 including a head disc 12, heads K1, K2 and drum 14 is rotatably mounted on shaft 4 by way of slide bearings 9 and 10. Threaded spindle 6 engages into a nut 11 fixed on drum 14. A magnetic tape 15 is guided around head wheel 8, for example over an angle of 180°. Heads K1 and K2 feed signals to recording or playback amplifiers via rotating transducers 23 and flexible lines 17. A motor M1 has a rotor 16 which is additionally fastened to drum 14. A stator 19 of motor M1 includes a stator winding 20 and is mounted on drum 14 by way of bearings 28 and 29 so as to be rotatable relative to drum 14. Stator 19 is connected with frame 1 by way of a pin 21 and a bearing 22 so that pin 21 is axially movable in the direction of axis A in a slit 13 in frame 1, while preventing rotation of stator 19. More particularly, pin 21 is mounted in the inner race of ball bearing 22. The outer race of ball bearing 22 rests with play in slit 13 whose width transversely to the axial displacement is somewhat greater than the outer diameter of ball bearing 22. As a result, when pin 21 undergoes axial displacement in slit 13, the outer race of ball bearing 22 is able to roll relative to the inner race and thus provide low-friction guidance in the direction of axial displacement.

Parts 9, 10, 11, 12, K1, K2, 14 and 16 form that part of the head wheel arrangement which rotates about axis A. Parts 19, 20, 21 and 22 constitute that part of the head wheel arrangement which is unable to rotate but is displaceable in the direction of axis A.

Figure 1B:
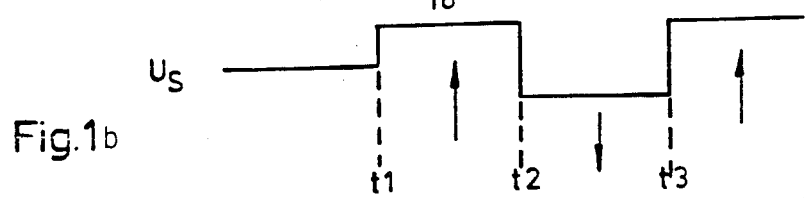
FIG. 1b is a signal diagram of a control voltage Us versus time and in the operation of the arrangement of FIG. 1.

The arrangement operates as follows: motor M1 is driven at a speed of approximately 6000 rpm so that head wheel 8 rotates at that speed around axis A. Shaft 4 and threaded spindle 6 are driven by motor M2 in the same direction as head wheel 8 and at the same rpm. Due to the identical rpm's, there is no relative movement between threaded spindle 6 and nut 11 so that head wheel 8 rotates but is not moved in the direction of axis A. This state is indicated in FIG. 1b before time t1. At time t1, a control voltage Us, applied via terminals 18 to coil 33 of motor M2, is increased so that motor M2 runs faster, e.g. at 6010 rpm. This causes threaded spindle 6 to slowly screw itself into nut 11 so that head wheel 8 undergoes a downward movement in the direction indicated by arrow 34a in the desired manner. At time t2, control voltage Us, and thus the rpm of threaded spindle 6, are reduced correspondingly so that now threaded spindle 6 screws itself out of nut 11 and head wheel 8 is moved upwardly in a direction indicated by arrow 34b. The amplitude of voltage Us assumed at times t1, t2, t3 determines the speed of the axial displacement and the time elapsed from t1 to t2 or from t2 to t3 determines the magnitude of such displacement.

When the maximum permissible axial displacement is reached, pin 21 acts on contacts 25 or 26 which switch off the drive from motors M1 and M2. This prevents nut 11 from being moved beyond the ends of threaded spindle 6. The upper end 4a of shaft 4 has a reduced diameter for allowing the head wheel to go out of engagement with threaded spindle 6.

An iron-free, electronically commutated, air coil motor is employed for motor M1 and an electronically commutated flat rotor for motor M2. However, mechanically commutated motors, armature motors and the like can also be employed.

The electronic control system for the two motors M1 and M2 is configured so that the two motors start up and run down uniformly and in synchronism. This is important to prevent an undue deviation in the rpm's of the two motors M1 and M2 from creating an unduly large axial displacement.

The cooperation between nut 11 and threaded spindle 6 can also be realized by a circulating ball drive. In such a drive, balls are arranged in part of a threaded passage and, after passing, for example, through one turn, drop back into a chamber or a cavity in the nut to then be re-introduced into a turn of the thread. Such circulating ball drives are commercially available and permit particularly smooth and clean transfer of motion without play or friction.

The arrangement according to FIG. 1a may have an associated device which determines the best axial displacement for the respective magnetic tape 15 with respect to position and amplitude and which correspondingly sets the axial displacement by means of control voltage Us. Such a device is disclosed in German Patent Application No. P 35 29 008.0. A capstan 27 (FIG. 2) may additionally be provided at frame 1 so as to effect the longitudinal transport of magnetic tape 15 at a slow speed of, for example, 20 mm per second.

Figure 2:
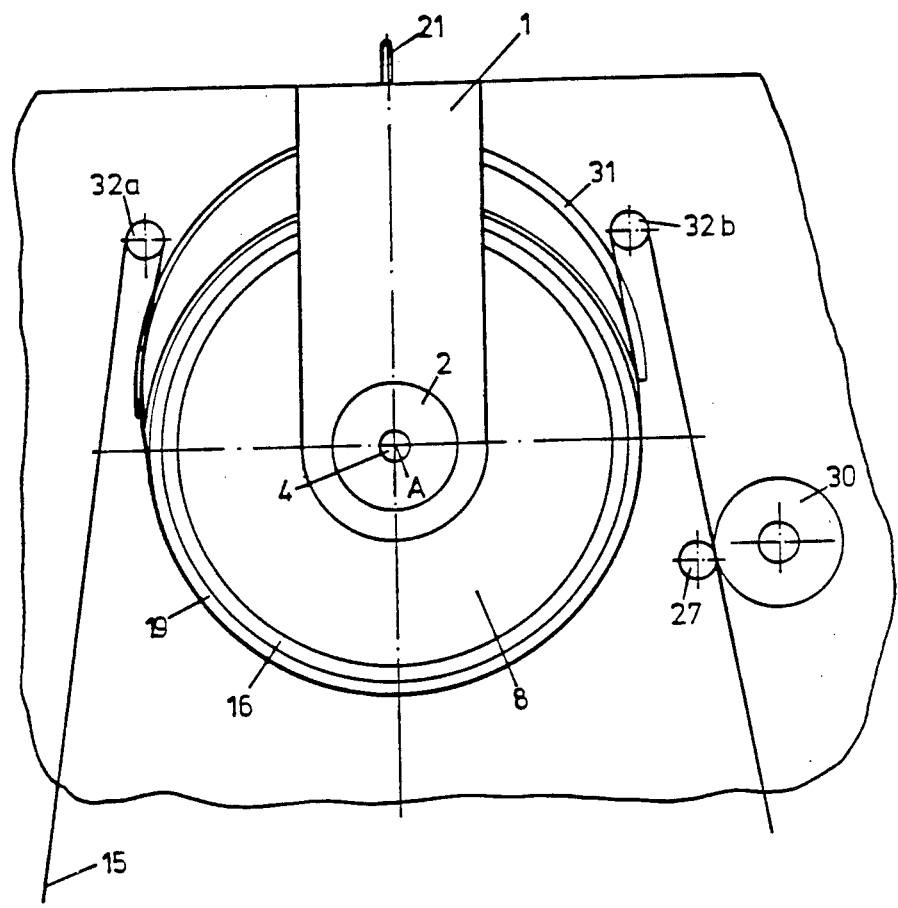
FIG. 2 is a top view of the arrangement of FIG. 1.

The following approximate values were present in one implementation of the illustrated embodiment:
  rate of rotation of head wheel 8: 6000 rpm
  diameter of head wheel 8: 17 mm
  maximum axial displacement : 4 mm
  width of magnetic tape 15: 8 mm FIG. 2 shows a top view of the arrangement according to FIG. 1. Magnetic tape 15 is guided via guide pins 32a and 32b around head wheel 8 over an angle of 180°. Tape 15 is here supported on a stationary guide shoe 31, which is fixed to frame 1. Guide shoe 31 ensures that tape 15 always has the same position in the axial direction relative to frame 1. Tape 15 is transported longitudinally by means of capstan 27 and a rubber pressure roller 30 which are likewise mounted in frame 1.

Figure 4A:
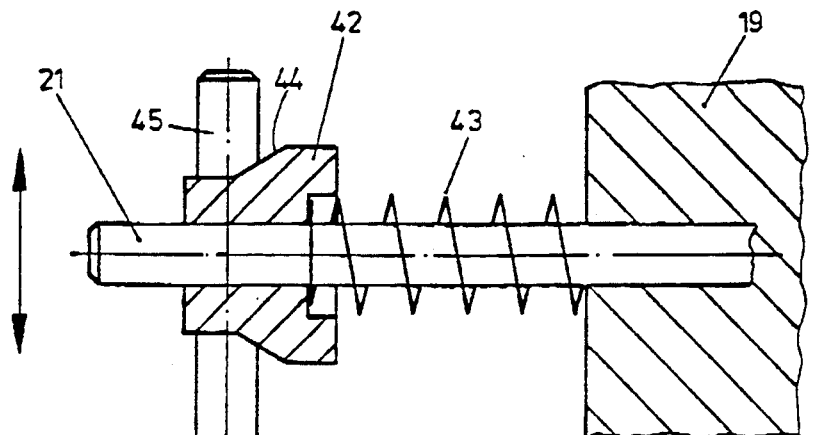
Figure 4B:
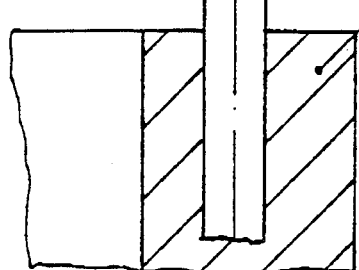
Figure 4B:
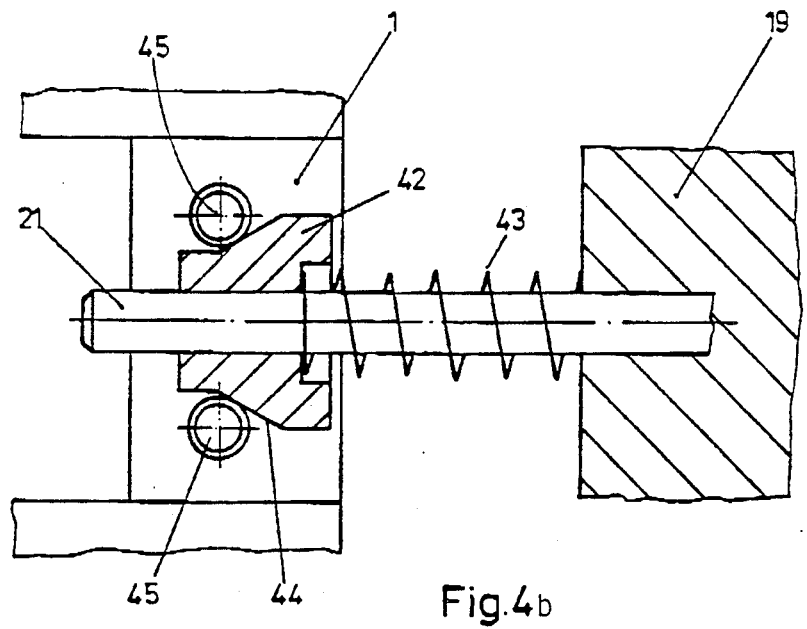

FIGS. 4a and 4b show another embodiment for the guidance of pin 21. On pin 21 which is fixed, as in FIG. 1, in the stator 19, a rotationally symmetrical guide member 42 is mounted so as to be axially displaceable without play. Spring 43 urges a conically configured surface 44 of guide member 42 against two rods 45 which are fixed to frame 1 so as to be mutually parallel in the direction of axial displacement. Pin 21 is thus seated without play in frame 1 so that pin 21 prevents rotation of stator 19, but permits movement of stator 19 in the direction of axial displacement with low friction. Rods 45 are preferably made of metal and guide member 42 is made of an abrasion resistant plastic, such as, for example, Teflon. Rods 45 and guide member 42 may each be made of metal or plastic. The material is selected in such a manner that an abrasion resistant and low friction contact results between members 44 and 45. Within slit 13, rods 45 extend in the direction of axial displacement. Thus, in FIG. 1, rods 45 would be disposed in slit 13 behind one another, perpendicularly to the plane of the page.

Figure 3:
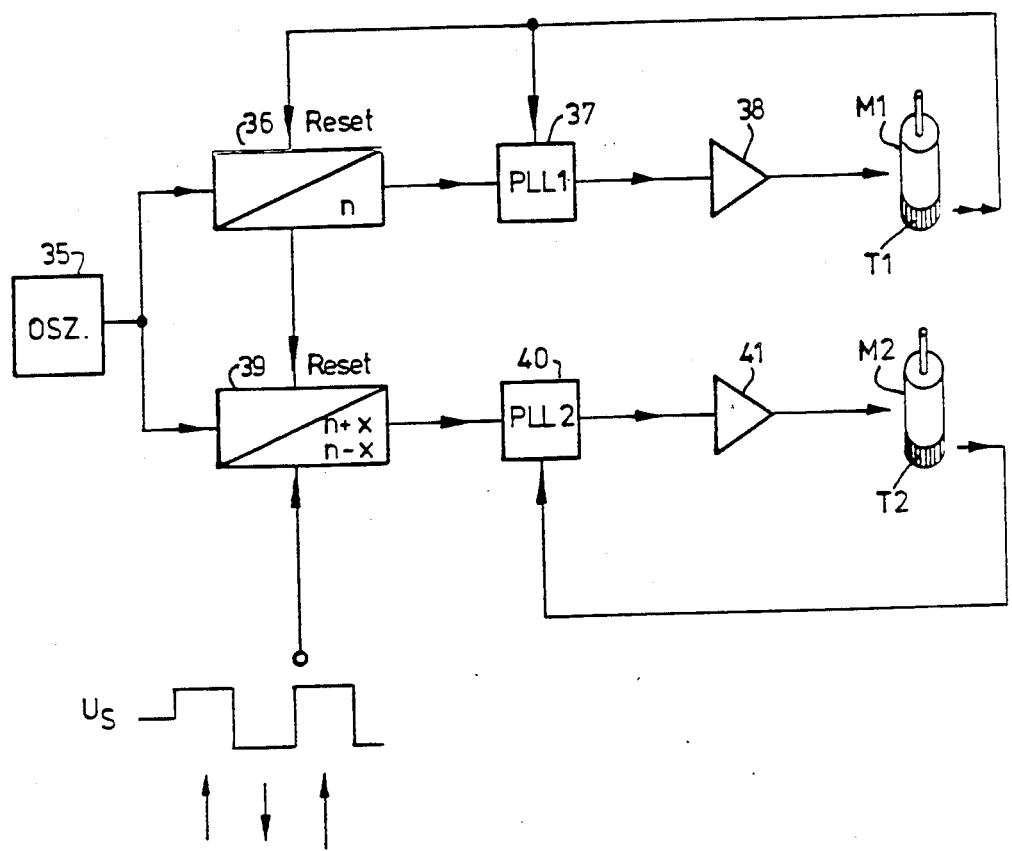
FIG. 3 ls a block circuit diagram showing a control circuit for the motors employed in FIG. 1.

FIG. 3 shows a circuit for controlling the two motors M1 and M2. A common oscillator 35 is provided for synchronous control. Oscillator 35 controls motor M1, which is provided with a tachogenerator T1, via a frequency divider 36, which has a dividing factor n, a phase lock loop (PLL) circuit 37 and a driver stage 38. Oscillator 35 also controls motor M2, which is provided with a tachogenerator T2, via a frequency divider 39, a PLL circuit 40 and a driver stage 41. Controlled by oscillator 35, motor M1 is driven at a constant rpm. By changing the dividing factor n to n+x or n−x, the rpm of motor M2 can be changed by way of control voltage Us so that the rpm of motor M2 changes as a function of control voltage Us to produce axial displacement of head wheel 8.

In addition, a lifting magnet, which acts on head wheel 8 and rotor 5 of motor M2 may additionally be used as an emergency and standstill brake. With such a lifting magnet which acts, for example, with rubber-like brake linings on the circumference of head wheel 8 and rotor 5, it is possible to brake, i.e. arrest head wheel 8 and rotor 5 at defined points in time, for a defined period of time and under certain conditions. These two parts are braked, for example, upon a change in the operating mode or for transport of the entire device. For example, in the rest state, a lifting magnet always acts as a brake on the mentioned parts and is released by a control unit only if the two mentioned parts 8 and 5 are intended to rotate. The lifting magnet can additionally be released by switches 25 and 26 to prevent movement of head wheel 8 beyond its two end positions.

It will be understood that the above description of the present invention is susceptible to various modifications, changes and adaptations, and the same are intended to be comprehended within the meaning and range of equivalents of the appended claims.

What is claimed is:

1. Head wheel arrangement for a magnetic recorder, comprising:
  a head wheel about which a magnetic tape is guided, said head wheel having an axis about which said head wheel is rotatable in a given direction;

a threaded spindle which is rotatable about said axis in said given direction, said head wheel being mounted on said threaded spindle for displacement relative to said threaded spindle in the direction of said axis when said head wheel and said threaded spindle are rotated in said given direction with different rates of rotation; and means for varying the rate of rotation of said threaded spindle in response to a control voltage so as to produce such displacement.

2. Arrangement as defined in claim 1, and further comprising first and second motors drivingly connected to said head wheel and said threaded spindle, respectively.

3. Arrangement as defined in claim 2, and further comprising a stationary frame, wherein said first motor has a rotor connected to said head wheel and a stator mounted at said stationary frame so as to be non-rotatable and axially displaceable along said axis.

4. Arrangement as defined in claim 3, wherein said threaded spindle is mounted at said frame so as to be rotatable and axially stationary relative to said frame.

5. Arrangement as defined in claim 1, wherein said frame includes tape guide means surrounding said head wheel in the region of an incoming and outgoing tape for guiding such tape so that such tape maintains the same position, relative to said frame, in the direction of said axis.

6. Arrangement as defined in claim 3, and further comprising capstan means disposed at said frame for longitudinal transport of a tape.

7. Arrangement as defined in claim 2, and further comprising common oscillator means for controlling said first and second motors.

8. Arrangement as defined in claim 7, wherein said first and second motors have first and second tachogenerators, respectively, and further comprising first and second phase lock loop circuits each having an input connected to the output of said common oscillator means, another input connected to a respective one of said tachogenerators and an ouput coupled to a respective one of said first and second motors.

9. Arrangement as defined in claim 8, and further comprising two frequency dividers each disposed between the output of said common oscillator means and a respective one of said phase lock loop circuits.

10. Arrangement as defined in claim 9, wherein the frequency divider connected to said second phase lock loop circuit has a variable dividing factor and a control input for receiving a control voltage for adjusting the variable dividing factor and thereby varying the rate of rotation of said threaded spindle.

11. Arrangement as defined in claim 2, and further comprising means for controlling said first and second motors during start-up and run-down so that their rpm's change uniformly and in synchronism.

12. Arrangement as defined in claim 2, wherein said motors are electronically commutated motors.

13. Arrangement as defined in claim 1, and further comprising a circulating ball drive for mounting said head wheel on said threaded spindle.

14. Arrangement as defined in claim 1, and further comprising drive means for rotatably driving said head wheel and said threaded spindle, and end contacts which are actuated when a part of said head wheel performs a maximum permissible displacement for turning off said drives means for said head wheel and said threaded spindle.

15. Arrangement as defined in claim 1, and further comprising means for determining an optimum displacement range for utilization of a tape by recording on and subsequently playing back such tape and controlling position and amplitude of the displacement of said head wheel accordingly.

16. Arrangement as defined in claim 1, wherein said threaded spindle has at least one end provided with means for following said head wheel and said threaded spindle to go out of engagement.

17. Arrangement as defined in claim 2, wherein said second motor has a rotor, and further comprising means, including a lifting magnet, for providing an emergency and standstill brake on said head wheel and the rotor of said second motor.

18. Arrangement as defined in claim 17, wherein said lifting magnet has rubber-like brake linings for acting on the circumference of said head wheel and of the rotor of said second motor.

19. Arrangement as defined in claim 1, and further comprising a stationary frame; a nonrotating member which is mounted at said frame so as to be displaceable in the direction of said axis; a pin connected to said head wheel and oriented radially relative to said axis; two stationary rods connected to said frame and extending parallel to one another in the direction of said axis; spring means; and a guide member connected to said pin and urged against said two stationary rods by said spring means, said guide member being displaceable in the direction of said axis.

* * * * *